(12) United States Patent
Zapf et al.

(10) Patent No.: US 8,266,892 B2
(45) Date of Patent: Sep. 18, 2012

(54) CALIBRATED DOSING UNIT, ESPECIALLY OF AN EXHAUST GAS TREATMENT UNIT

(76) Inventors: Friedrich Zapf, Karlstadt (DE); Thorsten Pelz, Neubrunn (DE); Heico Stegmann, Wuerzburg (DE)

( * ) Notice: Subject to any disclaimer, the term of this patent is extended or adjusted under 35 U.S.C. 154(b) by 902 days.

(21) Appl. No.: 12/011,329

(22) Filed: Jan. 25, 2008

(65) Prior Publication Data

US 2008/0178580 A1    Jul. 31, 2008

(30) Foreign Application Priority Data

Jan. 25, 2007   (DE) .......................... 10 2007 004 687

(51) Int. Cl.
*F01N 3/00*    (2006.01)
*F01N 3/10*    (2006.01)
*G06F 19/00*   (2011.01)
*G01R 35/00*   (2006.01)

(52) U.S. Cl. ............... 60/286; 60/295; 60/301; 60/303; 702/107

(58) Field of Classification Search .................... 60/274, 60/286, 295, 301, 303; 702/98, 100, 104, 702/107

See application file for complete search history.

(56) References Cited

U.S. PATENT DOCUMENTS

| | | |
|---|---|---|
| 1,059,370 A | 4/1913 | Johnson |
| 1,971,026 A | 8/1934 | Beall |
| 1,999,221 A | 4/1935 | Walker et al. |
| 2,697,581 A | 12/1954 | Ray |
| 2,938,703 A | 5/1960 | Dietz |
| 3,125,063 A | 3/1964 | Hultgren |
| 3,492,868 A | 2/1970 | Pontis |
| 3,707,954 A | 1/1973 | Nakada et al. |
| 3,894,432 A | 7/1975 | Coughlin |
| 3,903,858 A | 9/1975 | Hecht |
| 3,958,757 A | 5/1976 | Happel et al. |
| 4,146,485 A | 3/1979 | Broad |
| 4,203,554 A | 5/1980 | Zimmer et al. |
| 4,312,382 A | 1/1982 | Gebauer |
| 4,529,512 A | 7/1985 | Williamson et al. |
| 4,530,486 A | 7/1985 | Rusnak |

(Continued)

FOREIGN PATENT DOCUMENTS

CA    2 199 737    3/1996

(Continued)

OTHER PUBLICATIONS

Noack, English Abstract of DE 102005030421 A1, Jan. 4, 2007.*

(Continued)

*Primary Examiner* — Thomas Denion
*Assistant Examiner* — Audrey K Bradley
(74) *Attorney, Agent, or Firm* — Lipsitz & McAllister, LLC

(57) ABSTRACT

The invention relates to a volume quantity dispensing unit, in particular as a unit for metering an aqueous solution such as a urea/water solution, which can be used in an exhaust gas aftertreatment unit (17), comprising a pressure transducer (1), in particular comprising an electric pressure sensor, the volume quantity dispensing of the volume quantity dispensing unit following an electric signal (2) and the volume quantity dispensing unit being calibrated. There is provided at least one means (3) for changing a pressure value (4), which means changes the pressure value (4) in such a way that the pressure value (4), which is intended to correspond to the pressure in the volume quantity dispensing unit, is an input signal for a volume quantity (5) to be dispensed.

8 Claims, 2 Drawing Sheets

U.S. PATENT DOCUMENTS

| | | |
|---|---|---|
| 4,595,037 A | 6/1986 | LeBreton et al. |
| 4,610,786 A | 9/1986 | Pearson |
| 4,693,202 A | 9/1987 | Helpiö |
| 4,714,234 A | 12/1987 | Falk et al. |
| 4,742,964 A | 5/1988 | Ito et al. |
| 4,805,837 A | 2/1989 | Brooks et al. |
| 4,836,923 A | 6/1989 | Popoff et al. |
| 4,839,048 A | 6/1989 | Reed et al. |
| 4,842,737 A | 6/1989 | Reed |
| 4,963,332 A | 10/1990 | Brand et al. |
| 5,002,230 A | 3/1991 | Norskov et al. |
| 5,009,367 A | 4/1991 | Nielsen |
| 5,017,285 A | 5/1991 | Janik et al. |
| 5,045,192 A | 9/1991 | Terhune |
| 5,114,077 A | 5/1992 | Cerny |
| 5,122,264 A | 6/1992 | Mohr et al. |
| 5,236,579 A | 8/1993 | Janik et al. |
| 5,238,224 A | 8/1993 | Horsting |
| 5,299,776 A | 4/1994 | Brinn, Jr. et al. |
| 5,356,034 A | 10/1994 | Schlumberger |
| 5,399,264 A | 3/1995 | Pulek et al. |
| 5,413,711 A | 5/1995 | Janik |
| 5,468,388 A | 11/1995 | Goddard et al. |
| 5,522,218 A | 6/1996 | Lane et al. |
| 5,605,042 A | 2/1997 | Stutzenberger |
| 5,680,879 A | 10/1997 | Sheih et al. |
| 5,685,985 A | 11/1997 | Brown et al. |
| 5,884,475 A | 3/1999 | Hofmann et al. |
| 5,968,464 A | 10/1999 | Peter-Hoblyn et al. |
| 5,976,475 A | 11/1999 | Peter-Hoblyn et al. |
| 6,063,350 A | 5/2000 | Tarabulski et al. |
| 6,105,884 A | 8/2000 | Molnar et al. |
| 6,125,629 A | 10/2000 | Patchett |
| 6,203,770 B1 | 3/2001 | Peter-Hoblyn et al. |
| 6,209,315 B1 * | 4/2001 | Weigl ................ 60/274 |
| 6,279,603 B1 | 8/2001 | Czarnik et al. |
| 6,306,192 B1 | 10/2001 | Greif et al. |
| 6,474,961 B1 | 11/2002 | Timmer et al. |
| 6,513,323 B1 | 2/2003 | Weigl et al. |
| 6,516,607 B1 | 2/2003 | Brück et al. |
| 6,517,047 B2 | 2/2003 | Koch-Groeber |
| 6,526,746 B1 | 3/2003 | Wu |
| 6,539,708 B1 | 4/2003 | Hofmann et al. |
| 6,554,139 B1 | 4/2003 | Maxwell et al. |
| 6,631,883 B1 | 10/2003 | Van Den Brink |
| 6,685,829 B1 | 2/2004 | Baumann et al. |
| 6,912,846 B2 * | 7/2005 | Huber et al. ........ 60/286 |
| 6,945,035 B2 | 9/2005 | Hirooka et al. |
| 7,000,381 B2 | 2/2006 | Maisch |
| 7,100,366 B2 | 9/2006 | Hager et al. |
| 7,156,239 B2 | 1/2007 | Klotz et al. |
| 7,278,625 B2 | 10/2007 | Huber et al. |
| 7,296,689 B2 | 11/2007 | Klotz et al. |
| 7,316,545 B2 | 1/2008 | Lenke |
| 7,393,187 B2 | 7/2008 | Weigl |
| 7,458,204 B2 | 12/2008 | Plougmann |
| 7,481,049 B2 | 1/2009 | Huber et al. |
| 7,509,799 B2 | 3/2009 | Amou et al. |
| 7,594,393 B2 | 9/2009 | Offenhuber et al. |
| 7,594,516 B2 | 9/2009 | Maisch et al. |
| 7,617,991 B2 | 11/2009 | Wells et al. |
| 7,866,144 B2 | 1/2011 | Bakaj et al. |
| 7,895,829 B2 | 3/2011 | Suzuki et al. |
| 8,074,673 B2 | 12/2011 | Maisch et al. |
| 2002/0001554 A1 | 1/2002 | Czarnik et al. |
| 2002/0078732 A1* | 6/2002 | Bentley .............. 73/1.88 |
| 2002/0081239 A1 | 6/2002 | Palesch et al. |
| 2002/0088955 A1 | 7/2002 | Gamou et al. |
| 2003/0024320 A1 | 2/2003 | Bentley |
| 2003/0033799 A1 | 2/2003 | Scheying |
| 2003/0101716 A1 | 6/2003 | Hirooka et al. |
| 2003/0168620 A1 | 9/2003 | Dralyuk |
| 2003/0209482 A1 | 11/2003 | Klotz et al. |
| 2003/0209484 A1 | 11/2003 | Klotz et al. |
| 2004/0093856 A1* | 5/2004 | Dingle et al. ........ 60/286 |
| 2004/0098978 A1 | 5/2004 | Tarabulski et al. |
| 2004/0101450 A1 | 5/2004 | Mayer |
| 2004/0103641 A1 | 6/2004 | Maisch |
| 2004/0159721 A1 | 8/2004 | Shiraishi et al. |
| 2004/0179960 A1 | 9/2004 | Lenke |
| 2004/0191093 A1 | 9/2004 | Weigl |
| 2004/0262333 A1 | 12/2004 | Huber et al. |
| 2005/0069468 A1 | 3/2005 | Huber et al. |
| 2005/0229969 A1 | 10/2005 | Nguyen et al. |
| 2005/0284136 A1 | 12/2005 | Plougmann |
| 2006/0196172 A1 | 9/2006 | Johnson et al. |
| 2009/0038292 A1 | 2/2009 | Plougmann |

FOREIGN PATENT DOCUMENTS

| | | |
|---|---|---|
| CH | 359182 | 12/1961 |
| DE | 1 148 614 | 5/1963 |
| DE | 2 121 533 | 11/1972 |
| DE | 22 11 096 | 9/1973 |
| DE | 24 59 790 | 7/1976 |
| DE | 28 12 076 | 10/1979 |
| DE | 83 06 612 | 8/1983 |
| DE | 39 01 032 | 2/1990 |
| DE | 38 33 134 | 4/1990 |
| DE | 41 04 382 | 8/1992 |
| DE | 42 37 900 | 5/1993 |
| DE | 42 30 056 | 3/1994 |
| DE | 43 21 927 | 1/1995 |
| DE | 44 32 576 | 3/1996 |
| DE | 44 32 577 | 3/1996 |
| DE | 44 36 397 | 4/1996 |
| DE | 195 36 613 | 11/1996 |
| DE | 198 17 994 | 11/1999 |
| DE | 198 40 569 | 3/2000 |
| DE | 199 08 671 | 8/2000 |
| DE | 199 35 920 | 3/2001 |
| DE | 199 45 900 | 4/2001 |
| DE | 199 47 198 | 4/2001 |
| DE | 100 47 516 | 4/2002 |
| DE | 100 47 531 | 4/2002 |
| DE | 100 52 077 | 5/2002 |
| DE | 100 52 103 | 5/2002 |
| DE | 100 58 015 | 5/2002 |
| DE | 101 39 142 | 2/2003 |
| DE | 101 47 172 | 4/2003 |
| DE | 101 50 518 | 5/2003 |
| DE | 101 39 139 | 6/2003 |
| DE | 101 61 132 | 6/2003 |
| DE | 102 56 169 | 6/2003 |
| DE | 102 20 672 | 11/2003 |
| DE | 699 10 605 | 6/2004 |
| DE | 699 10 776 | 6/2004 |
| DE | 103 41 996 | 3/2005 |
| DE | 20 2005 002 544 | 5/2005 |
| DE | 103 59 522 | 7/2005 |
| DE | 10 2004 003 201 | 8/2005 |
| DE | 102 20 662 | 8/2005 |
| DE | 10 2004 006 333 | 9/2005 |
| DE | 10 2004 035 119 | 2/2006 |
| DE | 10 2004 054 238 | 5/2006 |
| DE | 20 2004 020 234 | 5/2006 |
| DE | 10 2005 056 395 | 11/2006 |
| DE | 10 2005 030 421 | 1/2007 |
| DE | 102005030421 A1 * | 1/2007 |
| DE | 10 2005 037 150 | 2/2007 |
| DE | 10 2006 014 074 | 10/2007 |
| DE | 103 62 140 | 4/2008 |
| EP | 0 663 226 | 7/1995 |
| EP | 0 826 097 | 3/1998 |
| EP | 1 236 499 | 9/2002 |
| EP | 1 281 426 | 2/2003 |
| EP | 1 314 864 | 5/2003 |
| EP | 1 435 458 | 7/2004 |
| EP | 1 481 719 | 12/2004 |
| GB | 2 137 110 | 10/1984 |
| GB | 2 336 212 | 10/1999 |
| JP | 56 164287 | 12/1981 |
| JP | 61197013 | 9/1986 |
| JP | 2000-240429 | 9/2000 |
| JP | 2001280189 | 10/2001 |
| JP | 2002525491 | 8/2002 |

| | | |
|---|---|---|
| WO | 01/91881 | 12/2001 |
| WO | 02/27280 | 4/2002 |
| WO | 02/42616 | 5/2002 |
| WO | 02/50497 | 6/2002 |
| WO | 03/016687 | 2/2003 |
| WO | 03/085270 | 10/2003 |
| WO | 2004/079168 | 9/2004 |
| WO | WO 2006122561 A1 * | 11/2006 |

OTHER PUBLICATIONS

Noack, Machine Translation of DE 102005030421 A1, Jan. 4, 2007.*
Bürkert Fluid Control Systems, "Solenoid Valves with Piston, Servo-Assisted", archived Jan. 10, 2005.*
Noack, English Translation of DE 102005030421 A1, translation provided Sep. 7, 2011, published Jan. 4, 2007.*

* cited by examiner

CALIBRATED DOSING UNIT, ESPECIALLY OF AN EXHAUST GAS TREATMENT UNIT

The present application claims priority of German application number 10 2007 004 687.3 filed on Jan. 25, 2007, which is incorporated in its entirety for all purposes.

The invention relates to a volume quantity dispensing unit which can be used in an exhaust gas aftertreatment unit, having a pressure transducer, whereas the volume quantity dispensing of the volume quantity dispensing unit follows an electric signal and the volume quantity dispensing unit is calibrated. Furthermore, the invention relates to the disclosure of methods for setting or calibrating the pressure output signal volume quantity characteristic of a volume quantity dispensing unit which can be used in an exhaust gas aftertreatment unit.

In the sense of the present invention, the term "calibration" is used differently to the manner in which it is used in conventional metrology. In conventional metrology, the term "calibration" refers to the adaptation of a value to a given standard value and the attempt to minimise deviation between both values, the standard value and the calibrated value.

The present document refers to a volume quantity dispensing unit. There are known regulators which monitor and/or measure and/or regulate with the aid of the value not the volume quantity dispensing but rather the mass quantity. Because there is a direct physical dependency, for example via temperature, density and viscosity, between volume quantity and mass quantity, the two terms are used interchangeably.

The exhaust gases of modern combustion engines contain pollutants such as, for example, nitrogen oxides. In the field of exhaust gas aftertreatment in combustion engines, in particular in diesel engines run on a lean mixture, urea SCR (selective catalytic reduction) technology is currently the most efficient way to reduce nitrogen oxides. In a variation of urea SCR technology, a liquid urea/water solution is added to the flow of exhaust gas of the combustion engine at a suitable location before the SCR exhaust gas catalyst directly via a metering device comprising an injector device, for example a fine atomising nozzle. In another variation, a urea/water aerosol is added. In the SCR exhaust gas catalyst, the nitrogen oxides are then converted, as is known, into elemental nitrogen and water vapour by the ammonia cleaved from the urea/water solution or the urea/water aerosol (thermolysis and hydrolysis).

PRIOR ART

DE 199 47 198 A1 and DE 100 47 516 A1 disclose two urea/water solution-based exhaust gas aftertreatment units. At least two adjustable pressure sensors are indicated in each system. The pressure value is recorded as accurately as possible and forwarded to an electronic control unit in which a regulator can be embodied. The electronic control unit calculates a control signal for the metering valve from the pressure value.

According to DE 20 2004 020 234 U1, an ASIC, which is set as far apart as possible from the pressure membrane of a pressure sensor, can be programmed in such a way that the signals of the pressure sensor can be provided in boosted, compensated-for and calibrated form after the ASIC. According to US 2003 024 320 A1, the compensation and calibration can ideally be carried out over the entire measuring range. Even non-linear compensation dependencies can be taken into account in this process. However, the aim of this is at all times to find an optimally accurate reproduced value for the actually prevailing pressure value such as, for example, in the above-mentioned systems. Mechanical systems, for example according to DE 699 10 776 T2, in many cases do not display such extensive compensation options. DE 699 10 776 T2 discloses an adjusting screw unit which mechanically allows at least one zero-point compensation. The compensation is intended to compensate for an initial offset.

None of the aforementioned solutions abstracts from the pressure value and considers what the actual purpose of the pressure value is. Instead, they seek to reduce metrological, mechanical and electronic falsifications to 0 by calibration and compensation.

Metering systems having at least partially exchangeable metering modules are conventionally used for adding the urea/water solution or the urea/water aerosol to the flow of exhaust gas. These metering systems are generally activated by the engine electronics or vehicle electronics (controller) as a function of nitrogen oxide contents, stored therein in a characteristic map, of the exhaust gas and the operating state of the engine. For example, DE 44 36 397 B4 describes an arrangement for the aftertreatment of exhaust gases by means of a urea/water aerosol. This arrangement comprises, inter alia, a metering module having a metering valve for the metering of an aqueous urea solution which is finely divided after the metering valve via a control valve by means of compressed air. DE 103 41 996 A1 describes an exhaust gas aftertreatment arrangement for diesel engines of vehicles, preferably of cars. This exhaust gas aftertreatment arrangement operates, as cars generally do not have a compressed air system, with a urea/water solution which is added directly to the flow of exhaust gas. This arrangement comprises, inter alia, a metering module having a pressure sensor and an injector device in the form of an injection valve having an injection nozzle via which the exhaust gas aftertreatment medium enters the flow of exhaust gas.

One problem of the cited prior art becomes apparent when a metering module which has, for example, become defective is exchanged for a new metering module of this type. The individual components of the metering modules, in particular the mechanical components thereof such as, for example, the metering valves, the control valves, the injection valves, the injection nozzles, etc., are subject to variation in terms of manufacture. This leads to different volume quantities per unit of time of the exhaust gas aftertreatment medium entering the flow of exhaust gas when the injection valves or nozzles are opened to identical degrees and a specific pressure is applied to the exhaust gas aftertreatment medium in the receiving space in various metering modules of a specific embodiment. This can lead, on the one hand, to non-compliance with the strict statutory limit values for nitrogen oxides, for example the Euro V stage, or, on the other hand, to an increase in pollution of the environment by the undesirable ammonia slip. The problem occurs mainly in each metering device comprising components which are subject to variation in terms of manufacture, i.e. manufacturing tolerances, and is not limited solely to metering devices for the reduction of nitrogen oxides, which are cited in the present document merely by way of example.

One possible solution to the problem would be to supply with each individual metering module a calibrated data record for the controller so as to allow error-free configuration of the pressure output signal volume quantity characteristic of a metering module of this type. The drawback of a solution of this type is its very high operating complexity. This is because each time a defective metering module is exchanged, a new calibrated data record, which is valid only for the new metering module, would have to be fed into the controller.

DESCRIPTION OF THE INVENTION

Professional users, on the other hand, require volume quantity dispensing units which can be exchanged simply and rapidly, wherein fluctuations, caused by an exchange of this type, in the pollutant content of the exhaust gas have to be avoided. In particular, the fluctuations in pollutant content following an exchange may not be so great as to risk non-compliance with statutory emission limit values. This requirement is met by a volume quantity dispensing unit having the features of claim 1 and by methods such as are defined in claims 7 and 8.

Advantageous developments may be inferred from the dependent claims.

All references in the present document to an "exhaust gas aftertreatment medium" relate to a substance or a material which, once it has been added to the flow of exhaust gas of the combustion engine or another combustion system, for example in interaction with a catalyst, brings about, at least partially, the conversion of at least one pollutant in the exhaust gas into harmless substances or into substances which are less harmful than pollutants. In the case of SCR, this conversion is known to be a chemical reduction process.

The term "exhaust gas aftertreatment medium" refers in the present document, in particular, to a liquid urea/water solution, referred to hereinafter as a UWS for short. For example, an 11-percent or a 32-percent UWS can be used as the exhaust gas aftertreatment medium.

The automotive industry, in particular, uses substances which have a similar effect to urea and are also suitable for exhaust gas aftertreatment in nitrogen oxides. Any substance of this type is also an exhaust gas aftertreatment medium in the sense of the present document.

The term "pollutant" refers in the present document, in particular, to a nitrogen oxide ($NO_x$). Other pollutants, such as for example hydrocarbons, are however not ruled out in principle.

According to the invention, a falsified pressure value is used with metrological awareness to compensate for the manufacturing tolerances of the components, which might falsify the volume quantity, and the pressure output signal volume quantity characteristic of a volume quantity dispensing unit which can be used in an exhaust gas aftertreatment unit is thus calibrated in a simple manner. The pressure value is the information contained in the signal dispensed by the pressure sensor. According to one configuration, an offset can be imposed on the pressure value. The controller is unable to see the actual pressure prevailing in the metering medium. The controller contains merely a pressure output signal, which differs from the actual pressure value and is provided with an additional value, as the input signal. According to a further configuration, the output curve of the pressure sensor can be changed or adapted. In other words, a plurality of factors or characteristics or multipliers or parameters of the prepared measured curve are adapted in the pressure sensor.

According to a further configuration, although both the falsified pressure value and the actual pressure value are supplied to the controller, the controller uses the falsified pressure value to calculate the amount to be added.

The term "calibration" refers to the adaptation of a measured value, which may in certain configurations even be relatively accurate, to environmental parameters and control variables, so the measured value can be used in a form which is falsified and thus differs from the actual value provided.

The volume quantity dispensing unit according to the invention is preferably used, in particular, as a unit for metering an aqueous solution, such as a UWS, which can be used in an exhaust gas aftertreatment unit. Advantageously, the pressure transducer of the volume quantity dispensing unit is embodied by an electric pressure sensor.

The volume quantity dispensing of the volume quantity dispensing unit follows an electric signal. Advantageously, this electric signal is generated by the controller based on the pressure output signal of the pressure transducer of the volume quantity dispensing unit.

According to the invention, there is provided at least one means for changing a pressure value, which means changes the pressure value in such a way that the pressure value, which is intended to correspond to the pressure in the volume quantity dispensing unit, is an input signal for a volume quantity to be dispensed. In this way, the volume quantity dispensing unit can be calibrated in a simple manner and the complexity of exchanging said volume quality dispensing unit can be kept low; in particular, there is advantageously no need for complex management of the calibrated data such as would otherwise be additionally necessary for each individual volume quantity dispensing unit.

The quantity of exhaust gas aftertreatment medium dispensed is also dependent on the operating temperature. According to one configuration, the pressure value to be dispensed by the pressure sensor is set in such a way that temperature fluctuations are compensated for by average calibration, calibration to an average operating temperature value and the accompanying deviation of the quantity dispensed from the metering unit.

Preferably, the volume quantity dispensing unit is used as a metering unit for the reduction of pollutant contents of the exhaust gas during the exhaust gas aftertreatment. Particularly preferred is the use for the reduction of nitrogen oxides, in particular in an SCR catalyst.

Advantageously, the means can be used to change the pressure value in the volume quantity dispensing unit. It is particularly preferable if the means comprises the pressure transducer and an adjustable shutter for altering the pressure value in the pressure transducer, wherein the adjustment of the shutter does not change the pressure output signal of the pressure transducer. This allows the manufacturing tolerances of the pressure sensor also additionally to be compensated for in a simple manner, wherein, according to a positive aspect, mechanical shutters can be configured in such a way that they ensure a permanent setting which is difficult to change. The setting, once selected, of a shutter can be set, in a manner which is difficult subsequently to change, by spatial arrangement, sealing, locking or otherwise.

The volume quantity dispensing unit uses a falsified pressure value. The pressure value is falsified to the extent that deviations from a desired quantity of a volume quantity are compensated for based on the falsified pressure value. Within the calibration, the pressure value is varied until the correct volume quantity is dispensed.

The invention also includes a method for calibrating the pressure output signal volume quantity characteristic of a volume quantity dispensing unit which can be used in an exhaust gas aftertreatment unit and comprises a pressure transducer. In this case, the volume quantity added per unit of time can be set to a predeterminable value by alteration, which is adapted to the manufacturing tolerance of the volume quantity dispensing unit, of a pressure value of the volume quantity dispensing unit. Beneficially, this method can also be applied to the volume quantity dispensing unit according to the invention, as the volume quantity dispensing unit according to the invention comprises a pressure transducer.

Carrying out the invention using an electronic circuit is more space-efficient than a mechanical implementation.

Because overall space is an important criterion in automotive engineering, an electronic embodiment by means of an ASIC or a comparable integrated circuit is particularly acceptable when use is made of the metering valve according to the invention. In certain configurations, it may be regarded as the best solution.

The pressure value which is actually metrologically recorded is therefore only of secondary importance for the metering unit. The pressure value should differ from the recorded pressure which actually prevails in the metering unit, in particular at the pressure measuring point, to the extent that the volume quantity which is desired at a specific pressure value is included in the falsification of the pressure value. The pressure value of the pressure transducer does not reflect the pressure value; on the contrary, the pressure value corresponds to a volume quantity. Tolerances, deviations and special features which are specific to the metering unit with regard to the volume quantity, and not with regard to the actual pressure value, are compensated for before, on, in or after the pressure transducer. The pressure value can also be altered in a plurality of different ways. The pressure value is falsified, not corrected.

DESCRIPTION OF THE FIGURES

Further advantageous characteristics and embodiments of the invention will be described with reference to the drawings set out hereinafter, in which.

The volume quantity dispensing unit according to the invention can be used as a metering unit, for example, in an exhaust gas aftertreatment unit, in particular in an exhaust gas aftertreatment unit integrated in a vehicle which is, in particular, equipped with a diesel engine. A use of this type is illustrated schematically in the block diagram of FIG. 1 which shows merely those components of the volume quantity dispensing unit that are instrumental to the invention.

Figure 1:
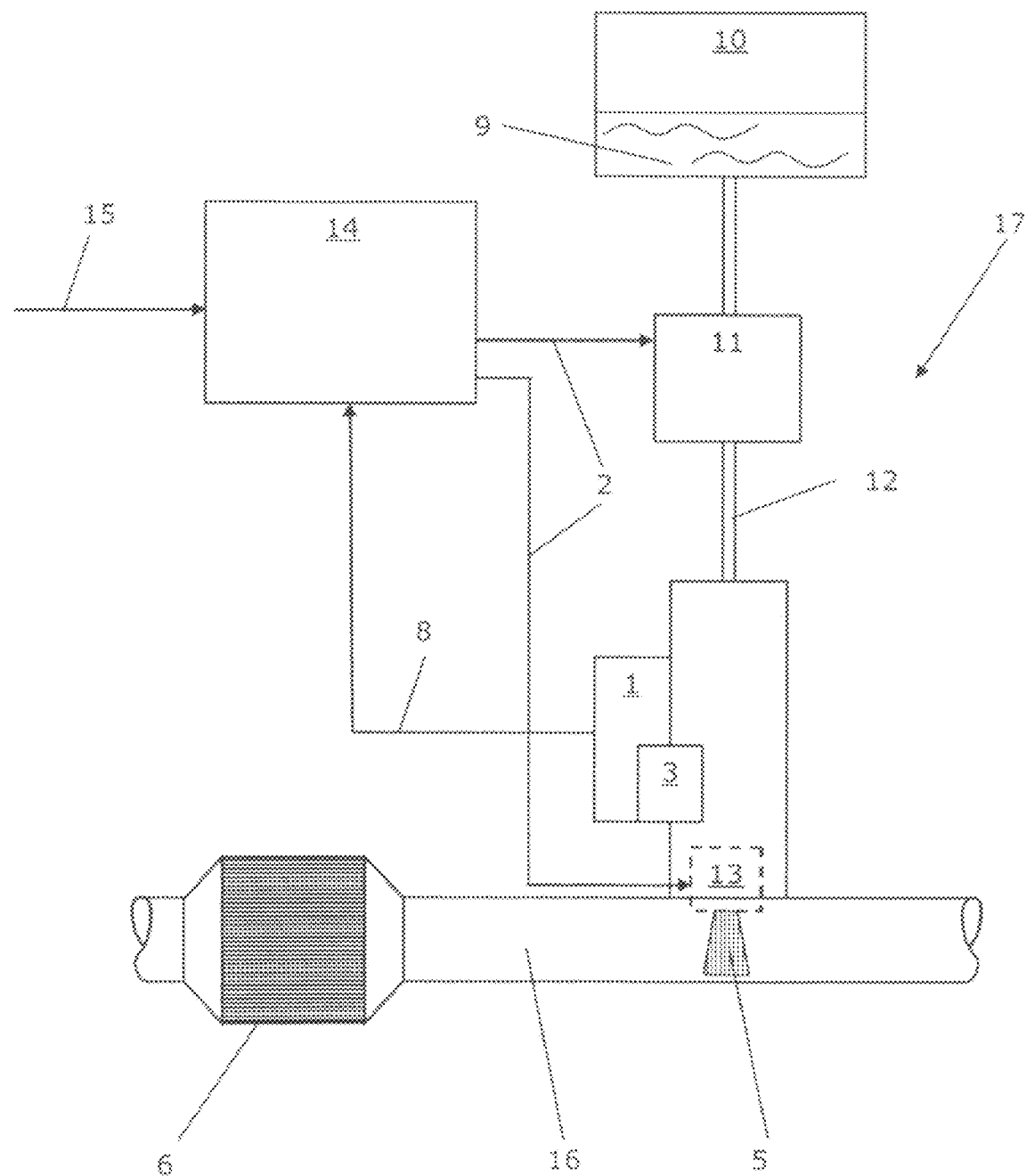
FIG. 1 is a (schematic) block diagram of an exhaust gas aftertreatment unit which is activated by a controller and comprises a volume quantity dispensing unit according to the invention.

The exhaust gas aftertreatment unit 17 is in this case activated by a controller 14 with the aid of an electric signal 2. The exhaust gas aftertreatment unit 17 adds an exhaust gas aftertreatment medium 9 to the exhaust gas train 16. The exhaust gas aftertreatment medium 9 is added to the flow of exhaust gas at a point which is located upstream before an SCR catalyst 6. For the sake of clarity, FIG. 1 shows merely a portion of the exhaust gas train 16 together with the SCR catalyst 6.

The exhaust gas aftertreatment medium 9 used in this case is an 11-percent UWS which is stored in a storage container 10. The UWS is if necessary—prompted by the controller 14—pumped from the storage container or supply container 10 into the volume quantity dispensing unit by means of a pump 11 and a feed line 12.

Figure 2:
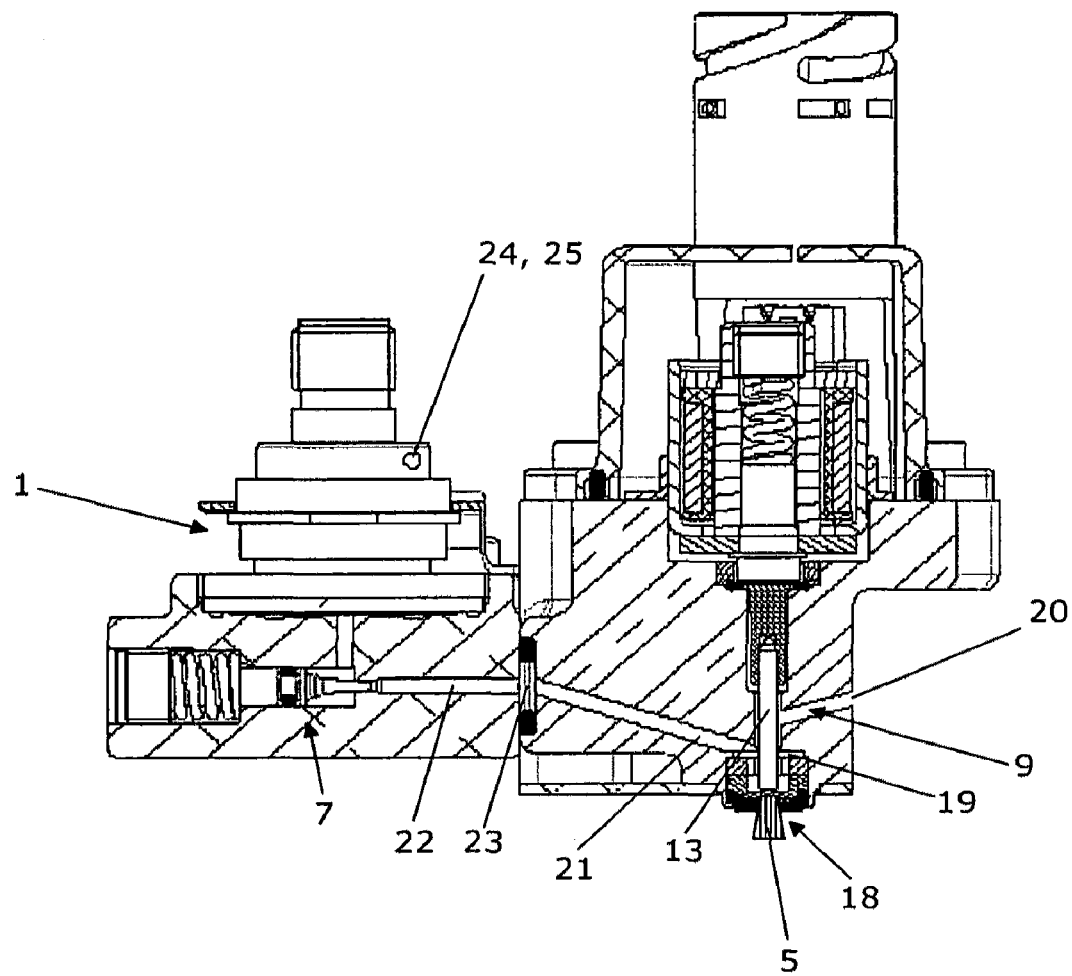
FIG. 2 shows an embodiment of a volume quantity dispensing unit according to the invention, the means comprising in this case both the pressure transducer and also an adjustable shutter and an electronic circuit, said electronic circuit interacting with the evaluation electronics of the pressure transducer which is configured as a pressure sensor.

The volume quantity dispensing unit has in this case an electromagnetically actuable ram/piston valve unit 13 which is arranged on the volume quantity dispensing unit on the exhaust gas side and can be activated by the controller 14. The application of the displacement force is in this case brought about by the magnetic field of a coil. Although it is shown in FIG. 2 for the sake of completeness, the coil does not have its own reference numeral, as it is of secondary importance to the invention. The same applies to the spring which pretensions the ram/piston valve unit 13 into the closed position. The metering valve is a (standard) closer. The electric signal 2 is, on the one hand, utilised or it is intended to activate the pump 11 and thus to place the UWS in the volume quantity dispensing unit under a specific pressure and, on the other hand, to set the degree of opening of the ram/piston valve unit 13 and thus the volume quantity 5 to be dispensed. The term "degree of opening" can, according to one configuration, refer to the opening width of the ram; according to one configuration, the term "degree of opening" refers to the relative opening time in relation to the operating time, also known as the blanking ratio.

The pressure transducer 1, which is in this case configured as an electric pressure sensor, is used to measure the pressure of the USW in the volume quantity dispensing unit. The pressure transducer 1 issues a pressure output signal 8 which acts as the input signal for the controller 14. Based on this input signal 8 and based on a further input signal which represents the operating state 15 of the engine, the controller 14 determines the volume quantity 5 to be dispensed and issues an electric signal 2 corresponding to the result of this calculation to the pump 11 and to the ram/piston valve unit 13. The volume quantity 5 which is actually dispensed thus follows the electric signal 2.

Manufacturing tolerances are inevitable in the production of volume quantity dispensing units. Therefore, the volume quantity which is actually dispensed by the volume quantity dispensing unit via the ram/piston valve unit 13 would differ in an undesirable manner from the volume quantity 5 to be dispensed as determined by the controller 14 if each volume quantity dispensing unit were not calibrated in a suitable manner. For carrying out this calibration, there is provided, according to the invention, a means 3 for changing a pressure value, which means changes the pressure value in such a way that the pressure value, which is intended to correspond to the pressure in the volume quantity dispensing unit, is an input signal for a volume quantity 5 to be dispensed.

A specific exemplary embodiment of a volume quantity dispensing unit according to the invention is illustrated in FIG. 2.

The metering device comprises in this case a pressure transducer 1 which is configured as an electric pressure sensor. Different embodiments of pressure sensors are known. They generally comprise a housing in which a measuring cell is accommodated. This is also the case in the embodiment shown. The lateral branch line 21, which leads out of the region of the tip of the metering valve as a rest line, opens into the static pressure chamber 22 of the pressure transducer 1. The pressure of the exhaust gas aftertreatment medium 9 is measured by the pressure sensor 1 of the metering device. The exhaust gas aftertreatment medium 9 can freeze at low temperatures. The exhaust gas aftertreatment medium 9 expands in this case, and this can damage the measuring cell of the pressure sensor 1. In order to prevent the pressure sensor 1 from becoming damaged when the exhaust gas aftertreatment medium 9 freezes, the pressure chamber 22 often contains a compressible volume or medium in which a specific pressure prevails. This pressure in the compressible volume or medium of the pressure chamber 22 will also be referred to in the present document as the "pressure in the pressure sensor" for short. The compressible volume in the pressure chamber 22 is in this case filled with air and delimited from the exhaust gas aftertreatment medium 9 by means of a membrane 23. A suitable pressure sensor other than that shown in the exemplary embodiment in FIG. 2 could also be used. In that case, the metering medium may also be said to be measured indirectly. A further configuration shows direct measurement of the exhaust gas aftertreatment medium, albeit adjusted in its absolute value via a shutter 7. An O-ring can also be provided instead of the membrane 23, so the metering valve and the pressure transducer 1 consist of two constructionally offset components which are to be joined two-dimensionally to form an exhaust gas aftertreatment unit 17 in order to be able to arrange the pressure sensor laterally of the main direction of flow.

In the exemplary embodiment shown, the pressure in the compressible volume of the pressure sensor 1 can additionally be set via an adjustable shutter 7. The means 3 comprises in this case the pressure transducer 1 and the shutter 7.

The volume quantity dispensing unit also has in this case a space 19 for receiving the exhaust gas aftertreatment medium 9. The receiving space 19 has in this case an opening 20 for supplying the exhaust gas aftertreatment medium 9. More than one supply opening 20 could also be provided. The exhaust gas aftertreatment medium 9 is introduced into the receiving space 19 through the supply opening 20. The pressure required for this purpose is generally applied by a pump 11, for example a membrane pump, which pumps the exhaust gas aftertreatment medium 9 from a supply container 10 into the receiving space 19 of the metering device via a feed line 12. The pump 11, the feed line 12 and the supply container 10 are not crucial to the represented aspect of the exemplary embodiment graphically shown, so they have been omitted from the drawings. However, in principle, the volume quantity dispensing unit according to the invention comprises these components too.

The receiving space 19 opens in the exemplary embodiment into a fine atomiser nozzle 18 which can be closed and opened by the ram/piston valve unit 13. The device, consisting of the fine atomiser nozzle 18 and the ram/piston valve unit 13, can thus, depending on the position of displacement of the ram/piston valve unit 13 relative to the fine atomiser nozzle 18, have different degrees of opening. More than one fine atomiser nozzle 18 could also be provided. Also known are configurations of a volume quantity dispensing unit which do not have any fine atomiser nozzle at their end, because the exhaust gas train is designed in such a way that optimum atomisation is rendered superfluous.

The volume quantity dispensing unit is used to add the exhaust gas aftertreatment medium 9 into the flow of exhaust gas of a combustion engine, for example a diesel engine, through the at least one fine atomiser nozzle 18.

The exhaust gas aftertreatment medium 9 can be placed under a specific pressure in the receiving space 19 via the supply opening 20. As described hereinbefore, this can be carried out, for example, by means of a pump 11. The activation of this pump 11 generally allows for the pressure output signal 8 of the pressure sensor 1. Furthermore, the pressure output signal 8 is used for controlling or regulating the degree of opening of the ram/piston valve unit 13 and the fine atomiser nozzle 18.

The exhaust gas aftertreatment medium 9 is added to reduce pollutant contents of the exhaust gas during the exhaust gas aftertreatment, in particular in an SCR catalyst 6.

According to the invention, the means 3 can be used to set the volume quantity 5 to be added of the exhaust gas aftertreatment medium 9. The means 3 allows the pressure value, i.e. for example the pressure output signal 8 of the pressure sensor 1 and/or the pressure in the pressure sensor 1, to be changed. The change must be set by a person skilled in the art in such a way that, at a specific pressure of the exhaust gas aftertreatment medium 9 and a predeterminable degree of opening of the ram/piston valve unit 13 and fine atomiser nozzle 18, a specific predeterminable volume quantity 5 per unit of time (=volume flow) of the exhaust gas aftertreatment medium 9 is added. The change in the pressure value by the means 3 thus calibrates the volume quantity dispensing unit in such a way that falsification of the pressure output signal volume quantity characteristic of the volume quantity dispensing unit, which is caused by manufacturing tolerances of the volume quantity dispensing unit, is corrected.

The volume quantity dispensing unit illustrated in FIG. 2 is, for example, calibrated to the addition of five liters of UWS per hour, the pressure of the UWS being nine bar. The pressure of the exhaust gas aftertreatment medium 9, in this case the UWS, could also be in the range of from approximately seven to approximately ten bar. A value other than five liters per hour, for example 4.5 or 5.5 liters per hour, could also be defined for the volume quantity 5 per unit of time to be added.

The pressure sensor 1 has in the exemplary embodiment an adjustable shutter 7 for altering the pressure in the pressure sensor 1. The meaning of the term "pressure in the pressure sensor" has been described hereinbefore. The adjustment of the shutter 7 does not change the pressure output signal 8 of the pressure sensor 1.

The means 3 preferably comprises an electric or electronic circuit 24. This circuit 24 comprises in the exemplary embodiment a potentiometer 25 and an ASIC. The ASIC is not shown in the drawings, as it is integrated into the evaluation electronics of the pressure sensor 1. Merely the actuating part of the potentiometer 25 is guided out of the housing of the pressure sensor 1 for changing the pressure value. The circuit 24 could also be embodied differently, for example by an operational amplifier circuit. The means 3 could also consist only of this electric or electronic circuit 24 in isolation.

The pressure sensor 1 of the exemplary embodiment has evaluation electronics (not shown in the drawings). The circuit 24 is integrated into these evaluation electronics. An electric or electronic circuit 24 can also be integrated subsequently.

The exhaust gas aftertreatment medium 9 is in this case in liquid form. It is, as stated hereinbefore, an 11-percent UWS (percent by volume). The UWS could also contain a different concentration of urea, for example 32.5 percent by volume. The exhaust gas aftertreatment medium 9 could also be present in a different state; for example, it could be provided in aerosol form.

The pressure sensor 1 is positioned in such a way that the pressure sensor measures a predominantly static pressure of the medium resting before it, whereas the main direction of flow through the metering valve runs past remote from the pressure sensor. The main direction of flow is not immediately before the pressure sensor; the main direction of flow is set apart. Although the pressure sensor measures, in one configuration according to the invention, the pressure of the exhaust gas aftertreatment medium directly, it measures only indirectly in relation to the main direction of flow. The pressure sensor therefore measures, as it were, in a branch line or a rest line which may be configured as a bag line.

The invention also includes a method for calibrating the pressure output signal volume quantity characteristic of a volume quantity dispensing unit which can be used in an exhaust gas aftertreatment unit 17 and comprises a pressure transducer 1. In this method, the volume quantity added per unit of time can be set to a predeterminable value by alteration, which is adapted to the manufacturing tolerance of the volume quantity dispensing unit, of a pressure value of the volume quantity dispensing unit.

This method can also be applied to the volume quantity dispensing unit according to the invention. In this case, the change in the pressure value by the means 3 calibrates the pressure output signal 8 of the pressure transducer 1 in relation to the volume quantity 5 per unit of time to be dispensed.

It is preferable to carry out the method according to the invention during the final check of the volume quantity dispensing unit, i.e. prior to dispatch.

Furthermore, it is conceivable and possible to use the means 3 to change the pressure value in the feed line 12 to the volume quantity dispensing unit. In such a case, the means 3 could, in particular, comprise a screw for constricting the feed line 12 to the volume quantity dispensing unit.

Although only one specific embodiment has been described in detail, it will be clear to any person skilled in the art that the pressure sensor signal, preferably an electric current or voltage signal, is changed in such a way as to eliminate the actual, inner pressure value inside the metering unit in which the pressure value, which is then actually to be dispensed to a controller, is used to compensate for, calibrate or change the desired or expected metering quantity or volume throughflow quantity of the exhaust gas aftertreatment medium. In this case, a suitable controller, which calculates and records further values in relation to the operating state of the engine, can be inserted between the pressure value and the activation of the metering valve of an exhaust gas aftertreatment unit for the forwarding of electric signals.

List of Reference Numerals

1. Pressure transducer
2. Electric signal
3. Means
4. Pressure value
5. Volume quantity
6. SCR catalyst
7. Shutter
8. Pressure output signal
9. Exhaust gas aftertreatment medium
10. Supply container
11. Pump
12. Feed line
13. Ram/piston valve unit
14. Controller
15. Operating state of the engine
16. Exhaust gas train
17. Exhaust gas aftertreatment unit
18. Fine atomiser nozzle
19. Receiving space
20. Supply opening
21. Branch line
22. Pressure chamber
23. Membrane
24. Electric or electronic circuit
25. Potentiometer

The invention claimed is:

1. A volume quantity dispensing unit, in particular as a unit for metering an aqueous solution such as a urea/water solution, which can be used in an exhaust gas aftertreatment unit, comprising:
a pressure transducer comprising an electric pressure sensor, a volume quantity dispensing of the volume quantity dispensing unit following an electric signal from a controller and the volume quantity dispensing unit being adapted,
at least one fine atomizing nozzle opening directly into an exhaust gas flow for apportioning only the aqueous solution directly into the exhaust gas flow of a combustion engine,
a ram/piston valve unit for opening and closing the at least one fine atomizing nozzle in different blanking ratios, and
at least one means for changing a pressure value, which means changes the pressure value in such a way that the pressure value, which is intended to correspond to a pressure in the volume quantity dispensing unit, is an input signal for a volume quantity to be dispensed,
wherein:
the aqueous solution is a liquid only solution;
the changing of the pressure value by the at least one means for changing a pressure value brings about an adaption of the volume quantity dispensing unit, by means of which falsification of a pressure output signal volume quantity characteristic of the volume quantity dispensing unit, which is caused by manufacturing tolerances of the volume quantity dispensing unit, is corrected, and
the at least one means for changing a pressure value comprises a potentiometer.

2. The volume quantity dispensing unit according to claim 1, wherein:
the at least one means for changing a pressure value comprises the pressure transducer and an adjustable shutter for altering the pressure value in the pressure transducer, and
an adjustment of the shutter does not change a pressure output signal of the pressure transducer.

3. The volume quantity dispensing unit according to claim 1, wherein:
the at least one means for changing a pressure value is adapted to change the pressure value in a feed line to the volume quantity dispensing unit, and
the at least one means for changing a pressure value comprises a screw for constricting the feed line to the volume quantity dispensing unit.

4. The volume quantity dispensing unit according to claim 1, wherein:
the at least one means for changing a pressure value is adapted to change the pressure value of the pressure transducer and thus a pressure output signal of the pressure transducer, and
the at least one means for changing a pressure value further comprises an ASIC.

5. The volume quantity dispensing unit according to claim 1, wherein the pressure value is falsified to an extent that deviations from a desired quantity of a volume quantity are compensated for based on the falsified pressure value.

6. A method for adapting the pressure output signal volume quantity characteristic of a volume quantity dispensing unit which can be used in an exhaust gas aftertreatment unit and comprises a pressure transducer, comprising:
apportioning only an aqueous solution directly into an exhaust gas flow of a combustion engine from at least one fine atomizing nozzle which opens directly into the exhaust gas flow,
opening and closing the at least one fine atomizing nozzle in different blanking ratios using a ram/piston valve unit, and
setting the volume quantity added per unit of time to a predeterminable value by changing of a pressure value of the volume quantity dispensing unit, wherein:
    the aqueous solution is a liquid only solution;
    the pressure value is changed by at least one means for changing the pressure value, which comprises a potentiometer; and
    the changing of the pressure value by the at least one means for changing a pressure value brings about an adaption of the volume quantity dispensing unit, by means of which falsification of the pressure output signal volume quantity characteristic of the volume quantity dispensing unit, which is caused by manufacturing tolerances of the volume quantity dispensing unit, is corrected.

7. The method according to claim 6, wherein:
the volume quantity dispensing unit comprises:
    a pressure transducer comprising an electric pressure sensor, a volume quantity dispensing of the volume quantity dispensing unit following an electric signal and the volume quantity dispensing unit being adapted, and
    the at least one means for changing a pressure value, which changes the pressure value in such a way that the pressure value, which is intended to correspond to a pressure in the volume quantity dispensing unit, is an input signal for a volume quantity to be dispensed; and
    the change in the pressure value by the at least one means for changing a pressure value brings about an adaption of a pressure output signal of the pressure transducer in relation to the volume quantity to be dispensed per unit of time.

8. The method according to claim 6, wherein:
the at least one means for changing a pressure value is adapted to change the pressure value of the pressure transducer and thus a pressure output signal of the pressure transducer, and
the at least one means for changing a pressure value further comprises an ASIC.

* * * * *